(12) United States Patent
Kim (10) Patent No.: US 9,871,955 B2
(45) Date of Patent: *Jan. 16, 2018

(54) CAMERA MODULE (71) Applicant: LG INNOTEK CO., LTD., Seoul (KR)

(72) Inventor: Min Soo Kim, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 1 day.

This patent is subject to a terminal disclaimer.

(21) Appl. No.: 14/848,824

(22) Filed: Sep. 9, 2015

(65) Prior Publication Data

US 2015/0381861 A1 Dec. 31, 2015

Related U.S. Application Data (63) Continuation of application No. 13/953,517, filed on Jul. 29, 2013, now Pat. No. 9,148,553.

(30) Foreign Application Priority Data

Jul. 30, 2012 (KR) .................. 10-2012-0083028

(51) Int. Cl.
| | |
|---|---|
| *H04N 5/225* | (2006.01) |
| *G03B 3/10* | (2006.01) |
| *G03B 17/02* | (2006.01) |
| *G02B 7/08* | (2006.01) |

(52) U.S. Cl.
CPC ............. *H04N 5/2253* (2013.01); *G02B 7/08* (2013.01); *G03B 3/10* (2013.01); *G03B 17/02* (2013.01); *H04N 5/2252* (2013.01); *H04N 5/2254* (2013.01); *H04N 5/2257* (2013.01); *G03B 2205/0053* (2013.01)

(58) Field of Classification Search
CPC ... H04N 5/2253; H04N 5/2254; H04N 5/2251
See application file for complete search history.

(56) References Cited

U.S. PATENT DOCUMENTS 8,144,243 B2* 3/2012 Kang ................ H01L 27/14618
348/374
2010/0208089 A1 8/2010 Chang
2011/0026149 A1 2/2011 Fan et al.
(Continued)

FOREIGN PATENT DOCUMENTS

CN 101056358 A 10/2007
EP 1992968 A1 11/2008
(Continued)

*Primary Examiner* — Twyler Haskins
*Assistant Examiner* — Fayez Bhuiyan
(74) *Attorney, Agent, or Firm* — Birch, Stewart, Kolasch & Birch, LLP (57) ABSTRACT

A camera module including a PCB mounted with an image sensor; a holder member disposed at the PCB; a lens module coupled to the holder member; an actuator disposed at an upper surface of the lens module; and an electronic circuit pattern extending along an outer surface of the holder member. Further, a first end of the electronic circuit pattern is electrically connected to the PCB, and a second end of the electronic circuit pattern is electrically connected to the actuator.

20 Claims, 5 Drawing Sheets

(56) References Cited

U.S. PATENT DOCUMENTS

| | | | | |
|---|---|---|---|---|
| 2011/0299181 A1* | 12/2011 | Pang | ................... | G02B 7/022 |
| | | | | 359/824 |
| 2012/0218450 A1* | 8/2012 | Pavithran | ............. | H04N 5/2257 |
| | | | | 348/296 |
| 2014/0092296 A1* | 4/2014 | Han | .................... | H04N 5/2257 |
| | | | | 348/373 |

FOREIGN PATENT DOCUMENTS

| | | |
|---|---|---|
| KR | 10-2012-0021085 A | 3/2012 |
| WO | WO 2010/029316 A2 | 3/2010 |
| WO | WO 2010/129454 A1 | 11/2010 |
| WO | WO 2011/145907 A2 | 11/2011 |
| WO | WO 2012/074224 A1 | 6/2012 |

\* cited by examiner

CAMERA MODULE

This application is a Continuation of application Ser. No. 13/953,517, filed Jul. 29, 2013, which claims the benefit of earlier filing date and right of priority to Korean Patent Application No. 10-2012-0083028, filed on Jul. 30, 2012, the contents of which are hereby expressly incorporated by reference in their entireties.

BACKGROUND OF THE DISCLOSURE

Field of Endeavor

The teachings in accordance with exemplary and non-limiting embodiments of this disclosure relate generally to a camera module.

Background

In a case an auto focusing operation is carried out in a conventional camera module, an AF (Auto Focus) terminal and a PCB AF pad must be conductibly connected to drive an actuator, which is disadvantageously susceptible to shock.

Particularly, development of a camera module configured to maintain an auto focusing function and handshake compensation function, and yet to minimize a height of the camera module is required by a user needs to a slimmer camera module installed on small-sized electronic products such as notebooks, smart phones and tablet personal computers.

SUMMARY OF THE DISCLOSURE

Exemplary and non-limiting embodiments of this disclosure are to provide a structure-improved camera module configured to maintain an auto focusing function and handshake compensation function, and yet to minimize a height of the camera module.

In one general aspect of the present disclosure, there is provided a camera module, the camera module comprising: a PCB (Printed Circuit Board) mounted with an image sensor;
a holder member mounted on the PCB;
a lens module screw-connected to the holder member;
an actuator mounted at an upper surface of the lens module, and arranged at a position lower than an upper surface of the holder member; and
an electronic circuit pattern formed on a surface of the holder member to conductibly connect the PCB and the actuator, where one end of the electronic circuit pattern is connected to the PCB, and the other end of the electronic circuit pattern is connected to the actuator.

In some exemplary embodiments of the present disclosure, the other end of the electronic circuit pattern may be connected to the actuator via a conductive epoxy.

In some exemplary embodiments of the present disclosure, the other end of the electronic circuit pattern may be connected to a terminal formed at the lens module and to a first connection unit, to thereby be conductible with the actuator.

In some exemplary embodiments of the present disclosure, the terminal may be provided with a first terminal and a second terminal, each of the first and second terminals being applied with an electric power of mutually different polarity.

In a second exemplary embodiment of the present disclosure, the terminal may be connected to the actuator and a second connection unit.

In some exemplary embodiments of the present disclosure, each of the first and second connection units may be a conductive epoxy.

In some exemplary embodiments of the present disclosure, each of the first and second connection units may be symmetrically formed relative to an optical axis.

In some exemplary embodiments of the present disclosure, the electronic circuit pattern may be formed at a lateral surface of the holder member, at an upper surface of the holder member, or on at least one of the lateral surface and the upper surface of the holder member.

In some exemplary embodiments of the present disclosure, each of the electronic circuit patterns formed at the upper surface of the holder member may take a shape of an arc and is symmetrically formed.

In some exemplary embodiments of the present disclosure, two to four electronic circuit patterns may be provided, each layer having a shape of an arc.

In some exemplary embodiments of the present disclosure, the lens module may be screw-connected to an inner surface of the holder member.

In some exemplary embodiments of the present disclosure, the camera module may further comprise a shield can wrapping the lateral surface and the upper surface of the holder member.

In a fourth exemplary embodiment of the present disclosure, an insulation member may be interposed between the shield can and the holder member.

In some exemplary embodiments of the present disclosure, a diameter of the actuator may be configured smaller than that of the lens module.

In some exemplary embodiments of the present disclosure, the lens module may include one or more lenses, and at least two terminals, one end of which is connected to the actuator, and the other end of which is connected to the electronic circuit pattern.

In some exemplary embodiments of the present disclosure, the electronic circuit pattern may be divided into four arcs at the upper surface of the holder member, each arc selectively connected to an anode terminal or to a cathode terminal.

In some exemplary embodiments of the present disclosure, the actuator may include any one of a MEMS (Micro Electric Mechanical System) actuator moved by using an electrostatic force and a piezoelectric force, a liquid crystal lens, a piezoelectric polymer lens, a non-MEMS actuator, a silicon type actuator, and a liquid lens, or a combination of at least two such actuators.

In some exemplary embodiments of the present disclosure, the actuator may perform an auto focusing function or a handshake compensation function through changes in thickness or shape of a fixed lens or changes in refractive indexes of incident light.

In some exemplary embodiments of the present disclosure, the actuator may be installed at a position lower than an extreme upper end of the holder member.

In some exemplary embodiments of the present disclosure, the PCB may include first to four terminals configured to supply an anode power or a cathode power to the electronic circuit pattern, and the first/third terminals, and the second/fourth terminals are supplied with electric power of same polarity, while the first/second terminals and the third/fourth terminals are supplied with electric power of mutually different polarities.

Exemplary embodiments of the present disclosure have an advantageous effect in that handshake compensation function and auto focusing function can be performed by changes in refractive indexes of incident light and changes in thickness or shapes of fixed lens, free from horizontal, vertical and tilting movement of a lens, and a height of a camera module can be reduced to enable a miniaturization of the camera module.

DETAILED DESCRIPTION

Hereinafter, exemplary embodiments of the present disclosure will be described in detail with reference to the accompanying drawings.

Figure 1:
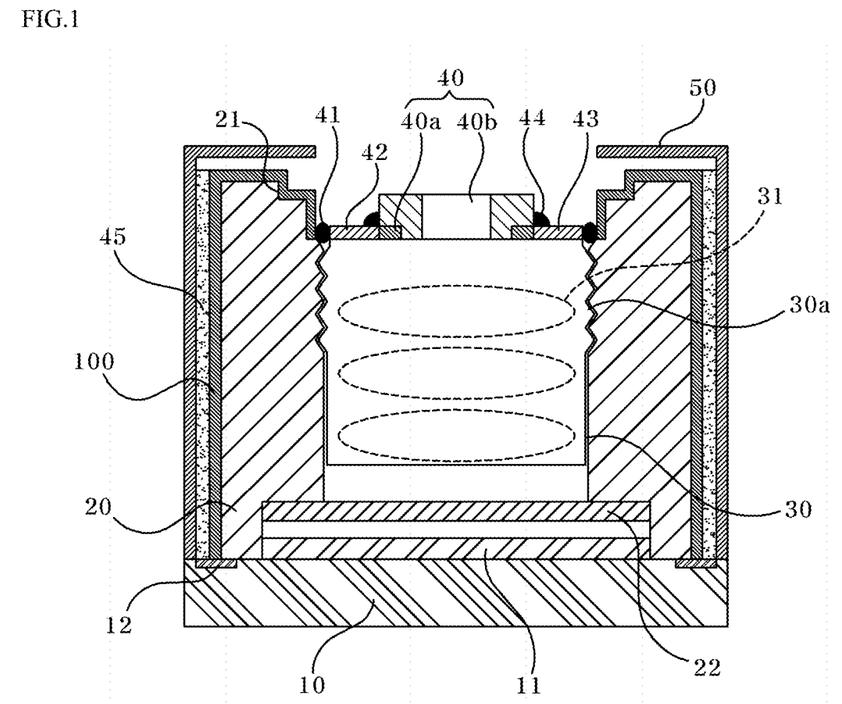
FIG. 1 is a schematic cross-sectional view illustrating a camera module according to an exemplary embodiment of the present disclosure.
Figure 2:
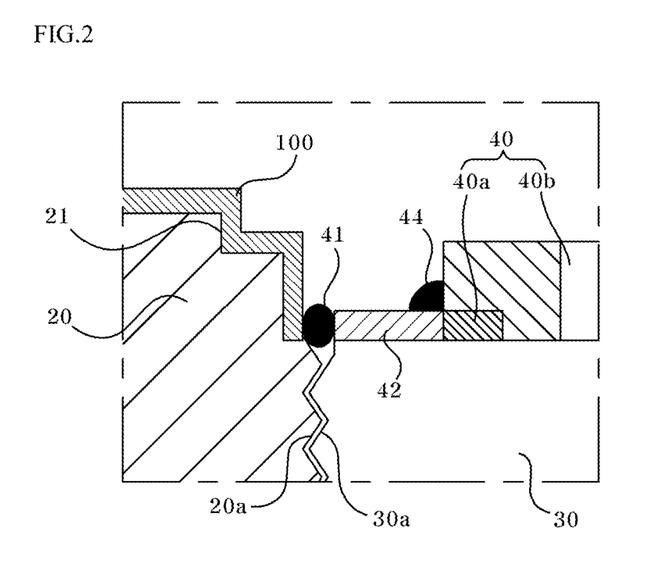
FIG. 2 is an enlarged view of a part in FIG. 1.
Figure 3:
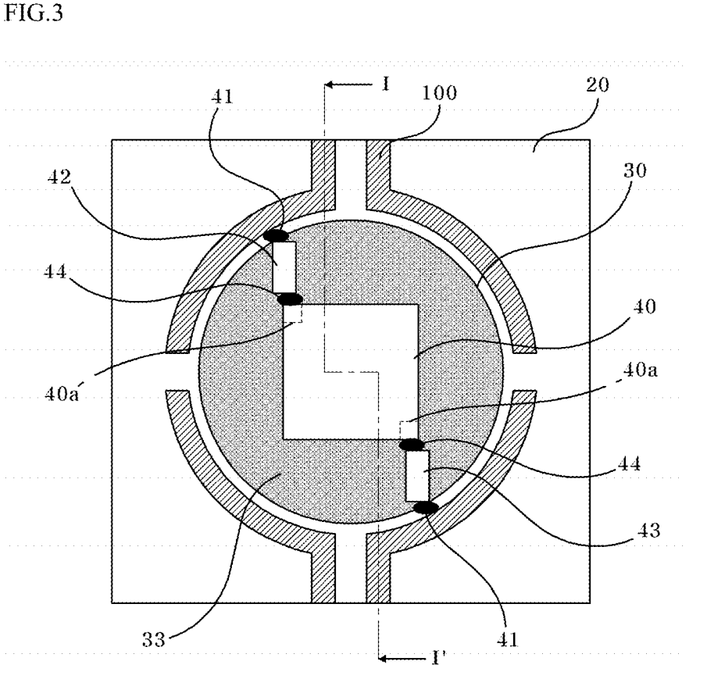
FIG. 3 is a plane view of FIG. 1.
Figure 4:
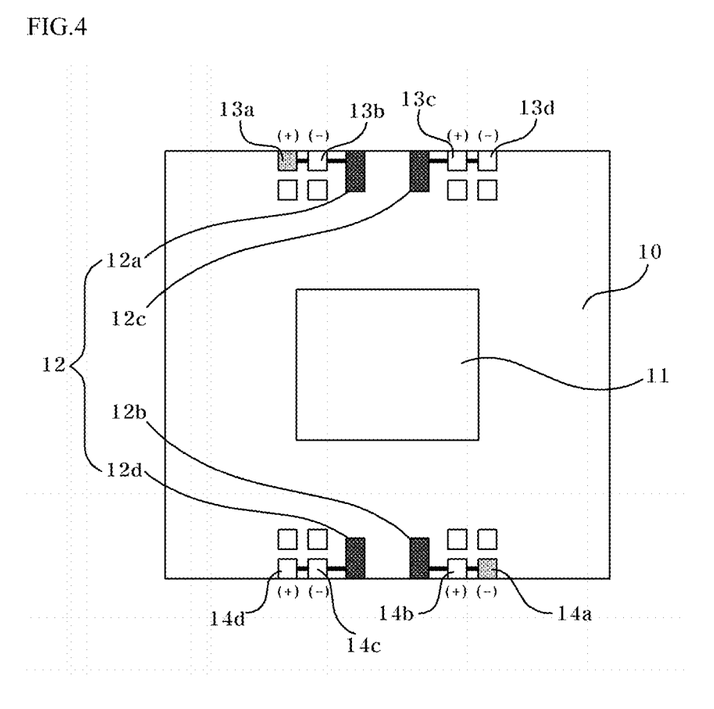
FIG. 4 is a schematic plane view illustrating a PCB according to an exemplary embodiment of the present disclosure.
Figure 5:
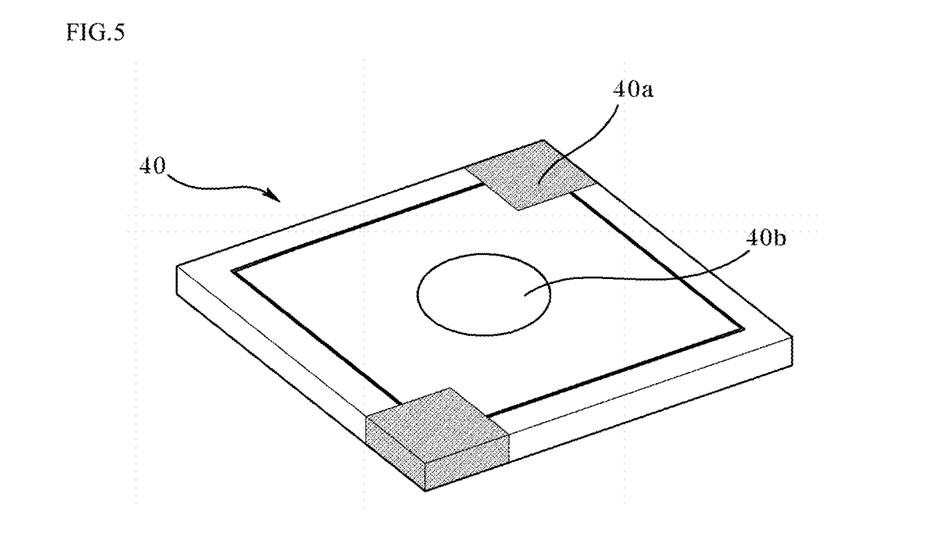
FIG. 5 is a schematic perspective view illustrating an actuator according to an exemplary embodiment of the present disclosure.

FIG. 1 is a schematic cross-sectional view illustrating a camera module according to an exemplary embodiment of the present disclosure, FIG. 2 is an enlarged view of a part in FIG. 1, FIG. 3 is a plane view of FIG. 1, FIG. 4 is a schematic plane view illustrating a PCB according to an exemplary embodiment of the present disclosure, and FIG. 5 is a schematic perspective view illustrating an actuator according to an exemplary embodiment of the present disclosure.

Referring to FIG. 1, the camera module according to the exemplary embodiment of the present disclosure includes a PCB (10), a holder member (20), a lens module (30) and an actuator (40).

The PCB (10) may include an image sensor (11), a terminal (12) and a controller. The image sensor (11) reads an image from outside. The terminal (12) may be conductively connected to an electronic circuit pattern (100, described later). Furthermore, the terminal (12) may include first to four terminals (12a-12d) each being supplied with an electric power of mutually different polarities, and may be circuit-connected to anode terminals (13a, 14b) and cathode terminals (13b, 14a) that are installed at a surrounding of the terminal (12). The controller may be mounted on a surface of the PCB (10) to output data and control signals of the image sensor (11) and the actuator (40).

Referring to FIG. 1, the holder member (20) is formed at an approximate center inner surface with a through hole formed with a screw thread, and the lens module (30) is screw-connected to the through hole. That is, the camera module according to the exemplary embodiment of the present disclosure is a focusing type camera module. Thus, lenses mounted on the lens module (30) are adjustable in focus positions relative to the image sensor (11) as the lens module (30) is screw-connected, and the position of the lens module (30) can be fixed when the focus is adjusted.

Turning to FIG. 1 again, the holder member (20) may be formed at an upper surface with a protrusion for protecting the actuator (40). The height of protrusion may be higher than that of the actuator (40). A surface of the holder member (20) may be formed with an electronic circuit pattern (100) conductibly connected to the actuator (40) and the PCB (10). Also, the electronic circuit pattern (100) can be an electronic circuit pattern.

The electronic circuit pattern (100) is so formed as to allow the surface of the holder member (20) to have a wiring pattern, and may be installed on any one of a lateral surface and an upper surface of the holder member (20). The electronic circuit pattern (100) may be installed on both the lateral surface and the upper surface of the holder member (20) as illustrated in FIGS. 1 and 2.

The electronic circuit pattern (100) may be formed using the so-called surface electrode pattern forming technology, or may be formed by insert injection molding of metal-materialed wiring members.

A distal end of the electronic circuit pattern (100) is connected to the PCB (10), and the other opposite distal end of the electronic circuit pattern (100) is conductively connected to the actuator (40). Thus, the actuator (40) and the PCB (10) may be conductively connected by the electronic circuit pattern (100).

The surface electrode pattern forming technology may be categorized into three methods.

A first method is a patterning method using a dual forming, where a part forming the holder member (20) and a part forming the electronic circuit pattern (100) are injection molded using mutually different synthetic resins. That is, the part of the holder member (20) is injection-molded using an insulation material, while the part for forming the electronic circuit pattern (100) is injection molded with a conductible synthetic resin, or with a metal plating-easy synthetic resin, and the electronic circuit pattern (100) is completed by using a post processing such as electroplating.

The second method is such that the holder member (20) is injection molded with impurities reactive to heat and light included, and an exposed lateral wall surface to be formed with the electronic circuit pattern (100) is laser-exposed via a surface patterning process to the injection-molded holder member (20) such as laser lithography to form the electronic circuit pattern (100) thereon. If the electronic circuit pattern (100) is formed by the above method, SMDs (surface-mount devices) or electronic accessory parts can be directly mounted because the electronic circuit pattern (100) itself has a conductible property.

Meanwhile, the third method is a patterning method by etching non-circuit part after metalizing an entire surface. That is, the third method is a method in which an entire surface is metalized, where an entire surface of the holder member (20) is metalized to form the electronic circuit pattern (100) on the exposed surface. That is, only the part to be formed with the electronic circuit pattern (100) remains untouched while the remaining part is etched to allow the electronic circuit pattern (100) to be integrally formed on the surface of the holder member (20).

Meanwhile, the electronic circuit pattern (100) provided by the above surface electrode pattern forming technology is formed on the exposed surface of the holder member (20). However, the present disclosure is not limited thereto, and the electronic circuit pattern (100) may be formed both on the exposed external surface of the holder member (20) and on the non-exposed internal surface of the holder member (20), or formed on any one of exposed or non-exposed surface. This is to select the arrangement of the electronic circuit pattern (100) on a single surface or a double surface according to wiring requirement for component mounting. Hence, if there is a need to mount a large number of electronic components, an exterior surface of the holder member (20) and an interior surface are also formed by the above methods with the electronic circuit pattern (100) to which components can be mounted.

Meanwhile, the connection through mechanism or equipment of insert method may be possible, instead of forming the electronic circuit pattern (100) using the above surface electrode pattern forming technology. That is, the insert injection may be used when the holder member (20) is injection molded for metal-materialed terminal member for forming the electronic circuit pattern (100).

If the electronic circuit pattern (100) is thus formed on the surface of the holder member (20), there is no need of preparing a separate connection member such as a PCB as illustrated in FIGS. 1 and 4.

That is, the actuator (40) and a terminal (12) of the PCB (10) are connected to the electronic circuit pattern (100) formed on the surface of the holder member (20) using a solder. The opposite surface is directly connected by first and second terminals (42, 43) (see FIGS. 1 and 3) connected to the actuator (40) using a conductive member such as a soldering, whereby a space for installing components can be reduced for easy application to miniaturized electronic products, and assembly process can be simplified to enhance the reliability as well.

A distal end of the electronic circuit pattern (100) may be conductibly connected to the terminal (12) installed on the PCB (11), and the other distal end of the electronic circuit pattern (100) may be conductibly connected to the first and second terminals (42, 43) connected to the actuator (40). At this time, the electronic circuit pattern (100) may be connected to the terminal (12) and the actuator (40) respectively using a solder or a conductive epoxy such as AG epoxy. The connecting structure will be described later.

A center of the lens module (30) is sequentially arranged with at least one sheet of lenses to capture an outside image toward the image sensor (11) side, and is screw-connected to a center of the holder member (20) using a separate component. A peripheral surface of the lens module (30) may be formed with a screw thread (30*a*) and an inner circumferential surface of the holder member (20) may be formed with a holder screw thread (20*a*) to be screw-connected to the screw thread (30*a*). It is therefore possible to adjust a focus between the plurality of lenses and the image sensor (11) when the lens module (30) is assembled using the structure thus mentioned.

The lens module (30) may be arranged at an upper surface with the actuator (40). At this time, the actuator (40) may be installed on any one of an upper surface of a first lens (31) and an upper surface of the lens module (30) and an upper surface of the holder member. In a case the actuator (40) is fixed to the upper surface of the first lens (31), the first and second terminals (42, 43) are arranged on the first lens (31), and in a case the actuator (40) is fixed to the lens module (30), the first and second terminals (42, 43) are arranged at an upper surface of the lens module, and in a case the actuator (40) is fixed to the holder member (20), the first and second terminals (42, 43) are arranged at an upper surface of the holder member (20).

The lens module (30) may be installed with a separate optical mechanism such as a shutter unit or an aperture, if necessary. That is, the lens module (30) may be sequentially arranged with at least one or more sheets of lenses, and in a case two sheets of lenses are arranged inside the lens module (30), an optical mechanism formed by the aperture and the shutter unit may be arranged at a space between two sheets of lenses, at a space between the lenses and the actuator (40), or at an upper surface of an extreme outer lens of the lenses, or at a bottom surface of the lens. This arranged relationship may be changed in response to a product design and configuration of camera unit.

The lens module (30) may be screw-connected to an inside of the holder member (20) so as not to be protruded. In this case, an approximate center of the holder member (20) is concavely formed, and an inner surface of the concave portion is screw-connected by the lens module (30). At this time, the actuator (40) fixed to the upper surface of the lens module (30) may be also arranged at the concave portion of the holder member (20). Thus, the actuator (40) can be rotated along with the lens module (30) in association with the rotating operation of the lens module (30).

At this time, the electronic circuit pattern (100) is formed at the lateral surface and the upper surface of the holder member (20) and the inner circumferential surface of the center concave proximity. At this time, as illustrated in FIG. 3, the electronic circuit pattern (100) may be provided with at least four divided circles on the upper surface of the holder member (20). The connecting structure thereof will be described later.

Meanwhile, referring to FIGS. 1 and 2, according to the exemplary embodiment of the present disclosure, the lens module (30) may be screw-connected to an inner surface of the holder member (20), and the electronic circuit pattern (100) may be also formed at a wall surface (21) opposite to the lens module (30). Although not illustrated, the electronic circuit pattern (100) may be replaced with a metal-materialed circuit member, and may be integrally insert injection molded when the circuit member is injection molded with the holder member (20).

Various structures may be used for the actuator (40). For example, as illustrated in FIG. 5, the actuator (40) may include a terminal unit (40*a*) and a variable lens (40*b*). At this time, the actuator (40) is fixed and needs no movement. The actuator (40) may take various shapes including a circular shape and a doughnut shape in addition to the square shape illustrated in FIG. 5.

The terminal unit (40*a*) may be installed at any one place of an upper surface, a floor surface, a lateral surface and a surface extended from an upper surface to a lateral surface. The terminal unit (40*a*) is conductively connected to the electronic circuit pattern (100), and may be conductively connected to the electronic circuit pattern (100) through a first connection unit (41) formed with a conductible member including a conductible epoxy such as a solder and an Ag epoxy according to the exemplary embodiment of the present disclosure.

The variable lens (40*b*) is arranged at an approximate center of the actuator (40) to allow light including an image to pass therethrough. The variable lens (40*b*) may be formed in a convex shape. The variable lens (40*b*) is changeable in refractive index in response to a control signal of a predetermined controller, whereby the light including the image can change a focusing position captured by the image sensor (11). At this time, the variable lens (40*b*) may be configured with an LC (Liquid crystal) lens, a liquid lens or a piezo-electric polymer lens.

The actuator (40) may be fixed to the upper surface of the first lens (31) of the lens module (30), or to the upper surface of the lens module (30). The actuator (40) automatically adjusts the focus of an image captured on the image sensor (11).

Turning to FIG. 1 again, a width of the actuator (40) may be formed smaller than that of the holder member (20). However, the present disclosure is not limited thereto, and albeit not being shown in FIG. 1, the actuator (40) may have a width corresponding to that of an upper surface of the holder member (20). In this case, the width of the actuator (40) preferably has a width smaller than that of the upper surface of the holder member (20) for miniaturization of the camera module.

Furthermore, the upper surface of the actuator (40) may be lower than an extreme upper end of the holder member (20). That is, the holder member (20) is concavely formed at a central proximity installed by the lens module (30) and the concave portion is arranged with the lens module (30) and the actuator (40), whereby the lens module (30) and the actuator (40) can be protected by the holder member (20).

According to an exemplary embodiment of the present disclosure, the upper surface of the actuator (40) may be installed lower than the extreme upper end of the holder member (20). Furthermore, a diameter of the actuator (40) may be smaller than that of the lens module (30), but the present disclosure is not limited thereto, and the diameter the actuator (40) may be greater than that of the lens module (30).

In a case the diameter of the actuator (40) may be smaller than that of the lens module (30), the terminal unit (40) may be formed on a floor surface of the actuator (40) to be connected to the first and second terminals (432, 43) installed at the upper surface of the lens module (30) or an upper surface of the first lens (31).

That is, as illustrated in FIGS. 1 and 3, in a case the actuator (40) is fixed to the upper surface of the first lens (31), the upper surface of the first lens (31) is formed with the first and second terminals (42, 43), and the terminal unit (40a) of the actuator (40) is conductively connected to the first and second terminals (42, 43) directly or via a method using a soldering.

Furthermore, the actuator (40) may be installed at an upper surface of the lens module (30), and in this case, the first and second terminals (42, 43) may be arranged at the upper surface of the lens module (30) to be conductively connected to the terminal unit (40a) of the actuator (40).

Meanwhile, the first and second terminals (42, 43) rotate along with the lens module (30) in association with rotating operation of the lens module (30), because the first and second terminals (42, 43) are installed at the upper surface of the lens module (30), or the upper surface of the first lens (31).

According to the exemplary embodiment of the present disclosure, the first and second terminals (42, 43) may be diagonally arranged. That is, the first and second terminals (42, 43) need to be connected in a wiring pattern of an anode (+) and a cathode (−) for control of the actuator (40), where, in a case the lens module (30) is screw-connected to the holder member (20), there is no knowing which position the first and second terminals (42, 43) are to be stopped at.

Hence, as illustrated in FIG. 3, in a case the first and second terminals (42, 43) are diagonally arranged, the first and second terminals (42, 43) may be correspondingly connected one-on-one, on an installed position of the lens module (30), to the quarterly-divided upper surface of the electronic circuit pattern (100).

Alternatively, albeit not being illustrated, the first and second terminals (42, 43) may not be diagonally arranged, but may be arranged in various shapes including a 'V' shape to correspond one-on-one to the quarterly-divided upper surface of the electronic circuit pattern (100). The arrangement may be variably changed according to design of the camera module.

The first and second terminals (42, 43) may be connected to an anode and a cathode respectively. For example, in a case the first terminal (42) is connected to the anode, the second terminal (43) may be connected the cathode, and in a case the first terminal (42) is connected to the cathode, the second terminal (43) may be connected the anode. The electronic circuit pattern (100) connected to the first and second terminals (42, 43) are respectively connected to an anode terminal (13a) and a cathode terminal (14a) at an opposite distal end of the a portion connected to the first and second terminals (42, 43), in order to allow the first and second terminals (42, 43) to be connected to the anode and the cathode, the detail of which will be described later.

Furthermore, a distal end of the first and second terminals (42, 43) may be connected to the electronic circuit pattern (100) and a first connection unit (41), and an opposite end may be connected to the actuator (40) and a second connection unit (44).

The first and second terminals (42, 43) may be formed on the upper surface of the first lens (31) by being coated with a conductive material, and may be formed by being inserted when a metal member is formed with the first lens (31). Alternatively, the first and second terminals (42, 43) may be provided on the first lens (31) using the surface electrode pattern forming technology as in the electronic circuit pattern (100). The first and second terminals (42, 43) may be provided with a conductive material such as an Ag epoxy, a solder or a conductive epoxy.

In a case the first and second terminals (42, 43) are diagonally arranged, the first and second connection units (41, 44) may be arranged on mutually symmetrical positions about an optical axis, but the present disclosure is not limited thereto, and an arranged relation of the first and second connection units (41, 44) may be variable according to design of camera module and positions of the first and second terminals (42, 43).

Meanwhile, albeit not being illustrated, the actuator (40) may be directly connected to the electronic circuit pattern (100) using an Ag epoxy, a solder or a conductive epoxy, free from with the first and second terminals (42, 43).

Various structures may be used for the actuator (40). According to the exemplary embodiment of the present disclosure, the actuator (40) may be provided with a configuration controlling a sheet of variable lens, and at this time, the actuator (40) is fixed and needs no movement. At this time, the variable lens may be configured with an LC (Liquid crystal) lens, a liquid lens or a piezoelectric polymer lens.

At this time, an area opposite to the image sensor (11) of the lens module (30) may be installed with an infrared cut-off member (22), or an infrared cut-off coating may be applied to the variable lens instead of installing a separate infrared cut-off filter.

As illustrated in FIG. 1, according to the exemplary embodiment of the present disclosure, the infrared cut-off member (22) may be provided at a bottom surface of an extreme rear lens of the lens module (30), but the present disclosure is not limited thereto. For example, the infrared cut-off member (22) may be provided at the first lens (31) of the lens module (30), if necessary, and may be interposed among the plurality of lenses installed at the lens module (30). Alternatively, the lenses may be coated, or an existing infrared cut-off member may be installed at an inner surface of a space. That is, any one surface of the lenses may be coated, or a separate infrared cut-off member may be used.

Although the abovementioned exemplary embodiment of the present disclosure has illustrated and explained that the actuator (40) formed with a variable lens is provided to perform the auto focusing and/or handshake compensating functions by refracting the passing light without physically moving the lens, it should be apparent that the present disclosure is not limited thereto.

The actuator (40) may be so configured as to perform a zooming function and a shutter function in addition to the auto focusing and handshake compensating functions. Furthermore, the actuator (40) may be replaced by any actuator capable of controlling one sheet of lens such as an actuator using a piezoelectric polymer and movable by using electrostatic force or a piezoelectric force.

That is, by way of non-limiting example, the actuator (40) may be any one of a MEMS (Micro Electric Mechanical System) actuator capable of moving by using the electrostatic force or the piezoelectric force, a MEMS piezoelectric actuator, a MEMS bimorph actuator, an MEMS thermal actuator, a MEMS magnetic actuator, a MEMS liquid actuator, a non-MEMS type actuator, a silicon type actuator, and a liquid lens, or any type of actuator that is configured by combination thereof.

Meanwhile, a metal-materialed shield can (50) wrapping the lateral surface and the upper surface of the holder member (20) may be separately formed at an outside of the holder member (20). In this case, an insulation member (45) such as an insulation epoxy may be positioned between the electronic circuit pattern (100) and the shield can (50), whereby short-circuit can be prevented between the electronic circuit pattern (100) and the shield can (50).

The insulation member (45) may perform the insulation function between the electronic circuit pattern (100) and the shield can (50), and also perform attachment and fixation of the holder member (20) to the shield can (50). Meanwhile, an exposed surface of the electronic circuit pattern (100) formed on the upper surface of the shield can (50) and the upper surface of the holder member (20) is discrete at a predetermined distance or disposed with an insulation member.

Meanwhile, the electronic circuit pattern (100) may be formed with an upper surface so divided as to have two to four arc-shaped surfaces. In the exemplary embodiment of the present disclosure, as illustrated in FIG. 3, the upper surface of the holder member (20) is formed with a total of four arc-shaped electronic circuit patterns (100).

The divided electronic circuit patterns (100) may be connected at one end to the terminal (12) of the PCB (10) using a soldering, and may be connected at the other end to the first and second terminals (42, 43) at the first connection unit (41). At this time, each of the arc-shaped electronic circuit patterns (100) may be symmetrically provided.

In a case the upper surface of the electronic circuit patterns (100) is formed with an arc shape, the first and second terminals (42, 43) can be connected to the divided electronic circuit patterns (100) on a one-on-one base, even if the actuator (40) screw-connected to the upper surface of the first lens (31) of the lens module (30) or fixed to the upper surface of the lens module (30) is stopped at any position.

Hence, in a case the first and second terminals (42, 43) connected to the actuator (40) are mutually arranged at a diagonal position, the terminal (12) connected to respective electronic circuit patterns (100) connected by the first and second terminals (42, 43) is connected to an anode and a cathode respectively, whereby the first and second terminals (42, 43) are applied with an electric power of mutually different polarities.

That is, as illustrated in FIG. 4, in a case the first terminal (42) is an anode and stops at the electronic circuit pattern (100) connected to a first terminal (12*a*), the second terminal (43) is a cathode and stops at the electronic circuit pattern (100) connected to a second terminal (12*b*). Then, the first terminal (12*a*) may be conductively connected to an anode terminal (13*a*) and the second terminal (12*b*) may be conductively connected to a cathode terminal (14*a*).

Furthermore, albeit not being illustrated, in a case the first terminal (42) is an anode and stops at the electronic circuit pattern (100) connected to a third terminal (12*c*), the second terminal (43) is a cathode and stops at the electronic circuit pattern (100) connected to a fourth terminal (12*d*). Then, the third terminal (12*c*) may be conductively connected to an anode terminal (13*c*) and the fourth terminal (12*d*) may be conductively connected to a cathode terminal (14*c*).

At this time, the first terminal (12*a*) and the anode terminal (13*a*), the second terminal (12*b*) and the cathode terminal (14*a*), the third terminal (12*c*) and the anode terminal (13*c*), the fourth terminal (12*d*) and the cathode terminal (14*c*) may be connected using a soldering.

Meanwhile, albeit not being illustrated, in a case the actuator (40) fixed to the lens module (30) is rotated to be positioned at a quadrant of other electronic circuit pattern (100), it should be apparent that the third and fourth terminals (12*c*, 12*d*) connected to the other electronic circuit pattern (100) may be connected in the same manner as that of the abovementioned exemplary embodiment.

Furthermore, as illustrated in FIG. 3, the actuator (40) may be installed at the upper surface of the lens module (30), and formed with a size smaller than that of the first lens (31), the present disclosure is not limited thereto. That is, albeit not being illustrated, in a case the actuator (40) is formed greater than the first lens (31), it is possible to form a shape of the protrusion at the upper surface of the holder member (20) may be formed greater than what is shown in FIG. 1 to correspond to a diameter of the actuator (40).

The actuator (40) is centrally formed with an area through which light can pass, and an area except for the actuator (40) may be arranged with a light cut-off surface, or a light cut-off member, or a light-shielding member (33) to prevent the light from passing through. The light-shielding member (33) may be formed with a light cut-off member using a light cut-off surface coated on the extreme outer surface of the lens or a separate film member. Thus, only the light having passed the actuator (40) can be incident on the lens module (30), where the size and shape of the light passing area of the actuator (40) may be determined based on design specification. By way of non-limiting example, a light passing area of the actuator (40) in FIG. 3 is circularly formed to function as an aperture.

According to the abovementioned configuration, an exact connection with the electronic circuit pattern (100) can be realized regardless of position of the lens module (30), and because the actuator (40) and the lens module (30) are arranged inside the holder member (20), miniaturization of a camera module can be advantageously carried out by reduced height of the camera module.

Furthermore, although the electronic circuit pattern (100) and the actuator (40), or the electronic circuit pattern (100) and the PCB (10) can be connected using a soldering, an Ag epoxy, a conductive epoxy or a wire bonding, the present disclosure is not limited thereto, and any configuration is acceptable as long as it is a conductible configuration.

Still furthermore, if the actuator (40) is configured with an LC lens, a liquid lens or a piezoelectric polymer lens, the electric power consumption is almost nil over a camera module with an actuator like a VCM (Voice Coil Motor) to enable a configuration of a camera module of low power consumption.

Although the present disclosure has been described with reference to a number of illustrative embodiments thereof, it should be understood that numerous other modifications and embodiments can be devised by those skilled in the art that will fall within the spirit and scope of the principles of this disclosure.

What is claimed is:

1. A camera module, comprising:
a PCB mounted with an image sensor;
a holder member disposed at the PCB;
a lens module coupled to the holder member;
an actuator disposed at an upper surface of the lens module;
an electronic circuit pattern formed on a surface of the holder member; and
a connection unit connecting the actuator to the electronic circuit pattern and comprising a conductive epoxy,
wherein the actuator comprises a terminal electrically connected to the connection unit,
wherein the electronic circuit pattern is formed with an upper surface as being divided in four electronic circuit pattern portions,
wherein two of the four electronic circuit pattern portions are connected to the actuator to apply an electric power, respectively,
wherein a first end of the electronic circuit pattern is electrically connected to the PCB, and a second end of the electronic circuit pattern is electrically connected to the terminal of the actuator, and
wherein the second end of the electronic circuit pattern is connected to the terminal of the actuator via the connection unit.

2. The camera module of claim 1, wherein the electronic circuit pattern is disposed on an outer lateral surface of the holder member and an upper surface of the holder member.

3. The camera module of claim 2, wherein the electronic circuit pattern disposed on the upper surface of the holder member is extended along an inner circumference of the upper surface of the holder member.

4. The camera module of claim 1, wherein the actuator is disposed at a position lower than an upper surface of the holder member, and
wherein the electronic circuit pattern is disposed on an outer lateral surface of the holder member, an upper surface of the holder member and a portion of an inner lateral surface of the holder member.

5. The camera module of claim 1, wherein the terminal comprises first and second terminals formed on an upper surface of the lens module and connecting the electronic circuit pattern and the actuator, and
wherein the first terminal is extended from the actuator at one side, and the second terminal is extended from the actuator at an opposite side of the one side.

6. The camera module of claim 5, wherein the connection unit comprises first and second connection units connecting the electronic circuit pattern to the first and second terminals of the actuator, and
wherein each of the first and second terminals is applied with an electric power of mutually different polarity.

7. The camera module of claim 1, wherein the lens module is screw-fixed to the holder member.

8. The camera module of claim 5, wherein the first and second terminals are connected to the actuator via a conductive epoxy.

9. The camera module of claim 1, wherein the four electronic circuit pattern portions are symmetrically formed relative to an optical axis.

10. The camera module of claim 9, wherein each of the four electronic circuit pattern portions has a shape of an arc.

11. The camera module of claim 1, further comprising a shield can wrapping an outer lateral surface and an upper surface of the holder member.

12. The camera module of claim 11, wherein an insulation member is interposed between the shield can and the holder member.

13. The camera module of claim 1, wherein a width of the actuator is smaller than a diameter of the lens module.

14. The camera module of claim 1, wherein the actuator includes any one of a Micro Electric Mechanical System (MEMS) actuator moved by using an electrostatic force and a piezoelectric force, a liquid crystal lens, a piezoelectric polymer lens, a non-MEMS actuator, a silicon type actuator, and a liquid lens, or a combination of at least two such actuators.

15. The camera module of claim 1, wherein the actuator performs an auto focusing function or a handshake compensation function through changes in thickness or shape of a fixed lens or changes in refractive indexes of incident light.

16. The camera module of claim 1, wherein the PCB includes first to four terminals configured to supply an anode power or a cathode power to the electronic circuit pattern, and the first and third terminals, and the second and fourth terminals are supplied with electric power of same polarity, while the first and second terminals and the third and fourth terminals are supplied with electric power of mutually different polarities.

17. A camera module, the camera module comprising:
a PCB mounted with an image sensor;
a holder member disposed at the PCB,
a lens module coupled to the holder member;
an actuator disposed at an upper surface of the lens module;
an electronic circuit pattern extends along an outer surface of the holder member, and
a connection unit connecting the actuator to the electronic circuit pattern,
wherein the electronic circuit pattern is formed with an upper surface as being divided in a plurality of electronic circuit pattern portions,
wherein a first end of the electronic circuit pattern is electrically connected to the PCB, and a second end of the electronic circuit pattern is electrically connected to the actuator through the connection unit,
wherein first and second terminals are formed on an upper surface of the lens module and connect the electronic circuit pattern and the actuator,
wherein the first terminal is extended from the actuator at one side, and the second terminal is extended from the actuator at an opposite side, and
wherein the first and second terminals are connected to the actuator via a conductive epoxy.

18. A camera module, the camera module comprising:
a PCB mounted with an image sensor;
a holder member disposed at the PCB,
a lens module coupled to the holder member;
an actuator disposed at an upper surface of the lens module;
an electronic circuit pattern extends along an outer surface of the holder member;
a connection unit connecting the actuator to the electronic circuit pattern; and
a shield can wrapping an outer lateral surface and an upper surface of the holder member, wherein the electronic circuit pattern is formed with an upper surface as being divided in a plurality of electronic circuit pattern portions, wherein a first end of the electronic circuit pattern is electrically connected to the PCB, and a second end of the electronic circuit pattern is electrically connected to the actuator, and wherein an insulation member is interposed between the shield can and the holder member.

19. The camera module of claim 1, wherein the four electronic circuit pattern portions are formed in an arc shape and symmetrically disposed in a diagonal direction of the actuator to each other.

20. The camera module of claim 19, wherein the two of the four electronic circuit pattern portions are connected to first and second terminals of the actuator via first and second connection units, respectively.

* * * * *